(12) United States Patent
Bahuguna

(10) Patent No.: US 7,834,988 B2
(45) Date of Patent: Nov. 16, 2010

(54) FINGERPRINT SENSOR USING A SPECTRAL FILTER AND A HOLOGRAPHIC OPTICAL ELEMENT

(76) Inventor: Ramendra Deo Bahuguna, 22582 Country View Dr., San Jose, CA (US) 95120

( * ) Notice: Subject to any disclaimer, the term of this patent is extended or adjusted under 35 U.S.C. 154(b) by 190 days.

(21) Appl. No.: 12/156,449

(22) Filed: Jun. 2, 2008

(65) Prior Publication Data
US 2009/0116030 A1 May 7, 2009

Related U.S. Application Data

(60) Provisional application No. 60/932,621, filed on May 31, 2007.

(51) Int. Cl.
*G06K 9/74* (2006.01)
*G06K 9/00* (2006.01)
(52) U.S. Cl. .......... 356/71; 382/124; 382/125
(58) Field of Classification Search .......... 356/71; 382/124, 125
See application file for complete search history.

(56) References Cited

U.S. PATENT DOCUMENTS

| | | | |
|---|---|---|---|
| 3,716,301 A | 2/1973 | Caulfield et al. | |
| 5,629,764 A * | 5/1997 | Bahuguna et al. | 356/71 |
| 5,650,842 A | 7/1997 | Maase et al. | |
| 5,892,599 A * | 4/1999 | Bahuguna | 359/15 |
| 6,038,043 A * | 3/2000 | Bahuguna et al. | 359/30 |
| 6,324,020 B1 | 11/2001 | Teng et al. | |
| 7,574,023 B2 * | 8/2009 | Sano et al. | 382/124 |

\* cited by examiner

*Primary Examiner*—Roy Punnoose

(57) ABSTRACT

In one embodiment, a fingerprint sensing system includes a interference narrow band pass filter, a holographic optical element, a transparent slab stacked together with optical cement. The finger is placed on the filter and illuminated by a narrow band source, the center of its band shifted appropriately with respect to the pass band of the interference filter. A camera on the other side of the slab receives the fingerprint image. The light from the valleys and ridges propagating in the direction of the camera are blocked by the interference filter. The light from the ridges at steep angles are bent by the holographic optical element and then directed towards the lens. This way the ridges are seen by the camera, but not the valleys. In another embodiment, a miniaturized version, the interference filter, a modified holographic optical element, and a blocking filter (if necessary) to block room light can be sequentially attached to the image sensor. In yet another embodiment, the interference filter can be directly coated over an image sensor creating a very simple fingerprint sensor. The principle behind all of the above embodiments is the same, viz: the spectral transmission band of an interference filter shifts with change in the angle of incidence.

13 Claims, 8 Drawing Sheets

FINGERPRINT SENSOR USING A SPECTRAL FILTER AND A HOLOGRAPHIC OPTICAL ELEMENT

CROSS-REFERENCE TO RELATED APPLICATIONS

This application claims the benefit of provisional patent application Ser. No. 60/932,621, filed May 31, 2007 by the present inventor.

1. BACKGROUND OF THE INVENTION

1. Field of Invention

This invention relates to acquisition of fingerprints and other relieved-surface images via optical means. This invention relates more particularly to the use of total internal reflection and spectral shift of the transmission band in Interference filters due to change in the angle of incidence.

2. Prior Art

Optical fingerprint sensors are usually based on total internal reflection of light. The principle of total internal reflection can be applied in two different ways to create a sensor. The first kind is an absorptive sensor and the second one is scattering-type.

2.1. Absorptive Sensor

The finger is placed on the surface of a glass prism and light is incident through another face of the prism. The angle of incidence is greater than the critical angle and hence all of the light is totally internally reflected from the valleys of the finger. The ridges, however, absorb most of the light. This way the valleys appear bright and the ridges appear dark. This results in a high contrast fingerprint image. Such a sensor has been described by Caulfield et. al. in their U.S. Pat. No. 3,716,301. This sensor suffered from trapezoidal distortion which was later corrected by Bahuguna et. al. in their U.S. Pat. Nos. 5,629,764 and 5,892,599 by holographic means. FIG. 1 illustrates the geometry of the sensor by Caulfield et. al.

2.2. Scattering-Type of Sensor

Again, like in the absorptive sensor the finger is placed on the glass surface of a prism. The incident light, however, is almost normal to the finger. The viewing angle, in this case, is greater than the critical angle. Light from the ridges is scattered in all directions and is received by the optical system whose optical axis is inclined at an angle greater than the critical angle. The light from the valleys, in glass, is confined to a cone whose semi-angle is equal to the critical angle and hence is not received by the camera. This results in a high contrast image of the fingerprint; the valleys appearing dark in this case and the ridges bright. U.S. Pat. No. 6,324,020 by Teng et. al describes such a sensor with reduced trapezoidal distortion and is shown in FIG. 2. U.S. Pat. No. 5,650,842 by Maase et. al also describes such a sensor using a telecentric camera system.

THE PRESENT INVENTION

1. Summary of the Invention

The present fingerprint sensor consists of a Holographic Optical element in combination with an interference based spectral filter. The holographic optical element has the property to focus a beam of light incident from a certain direction; the spectral filter passes a narrow range of colors. The two are sandwiched together and glued onto a glass slab. A camera with a lens is placed at a suitable distance from the sandwich to focus the fingerprint. The unit is shown in FIG. 3a. The finger is placed over the sandwich and uniformly illuminated by a number of laser diodes capable of emitting light of suitable color. These laser diodes are placed in a "U" shape surrounding the fingerprint as shown in FIG. 3b.

2. The Basic Principle

Igaki et. al. (Applied Optics, Vol. 31, pp. 1794-1802 (1992)) came up with a sensor that was based on total internal reflection. In their method, light from the valleys of the finger can only be seen within a cone whose angle is the critical angle in the sensor material. Light from ridges, however, is scattered in all directions. To separate the information of ridges from the valleys, i.e. for good contrast, only the rays at an angle greater than the critical angle are collected. This way the rays from the valleys are avoided. The rays from the ridges are then bent by a holographic grating and focused by a camera. This way the final image is projected normal to the camera. The image, however, is laterally shifted with respect to the actual finger and aberrated with astigmatism principally caused by the holographic grating. Expensive optics is needed to correct the aberrations. When the distance between the hologram and an object to be detected is shortened in a hologram reconstruction mode, aberrations can be eliminated which is what has been achieved in the invention described below. In fact the distance has been reduced to few microns in one of the embodiments. This has been made possible by using the fact that in a spectral band pass interference filter the pass band shifts with change in the angle of incidence of the incoming light ray.

The present invention makes it possible to see the image in a direction normal to the finger with no significant lateral shift thus avoiding the use of expensive optics. It is based on the fact that the central wavelength of the transmission band of a narrow band interference filter depends on the angle of incidence, and shifts to shorter wavelengths as the angle of incidence is increased. FIG. 4 illustrates the principle of operation. As an example, let us shine the finger with light at 635 nm and select a filter whose bandpass is centered at 728 nm and designed for normal incidence. The light at a shorter wavelength such as 635 nm, scattered from the valleys is confined within the critical angle, say 420, of the filter medium. Even at 420 the shift in the transmission band of the filter is not enough to allow light at 635 nm to get through. Hence the light from the valleys is blocked by the spectral filter and is not collected by the camera. The light from the ridges is scattered in all directions. Light from the ridges around say 450, shifts the central band of the spectral filter very close to 635 nm, thus allowing the light to be transmitted by the filter. The transmitted rays which originate from the ridges are then bent and focused by the holographic optical element towards the camera. Thus the valleys appear dark and the ridges appear bright leading to a high contrast fingerprint image. The numbers used in the above example are for illustration only. A prototype using numbers which were close to the one discussed above has been built and works well. Exact calculations can be made for spectral shifts vs. angle of incidence and a fingerprint device built with any narrow interference band pass filter with the appropriate wavelength of the light source.

3. Miniaturized Version

The above sensor shown in FIG. 3 (and FIG. 4) can be miniaturized by directly coating a holographic emulsion on an image sensor and creating the holographic optical element in it. The spectral filter can then be directly fabricated over the hologram. This way the use of lens and glass slab is avoided, leading to a miniature sensor. In this case the holographic optical element is not a converging one and simply bends the inclined rays from the ridges in a direction normal to the image as shown in FIG. 5. The spectral filter and the holographic emulsion are very thin (several micrometers.)

Another way to miniaturize the sensor is to directly coat the interference filter onto the image sensor (without the holographic element) as shown in FIG. 7. The rays from the ridges will then be incident on the image sensor at an angle causing some energy loss on reflection. The rays from the valleys are of course blocked as explained above.

DETAILED DESCRIPTION OF THE INVENTION

Figure 1:
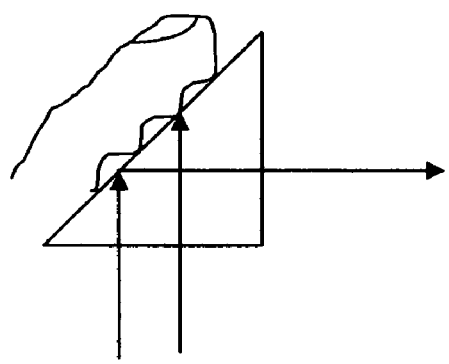
FIG. 1 illustrates the principle of a typical absorptive type of fingerprint sensor based on total internal reflection of light.
Figure 2:
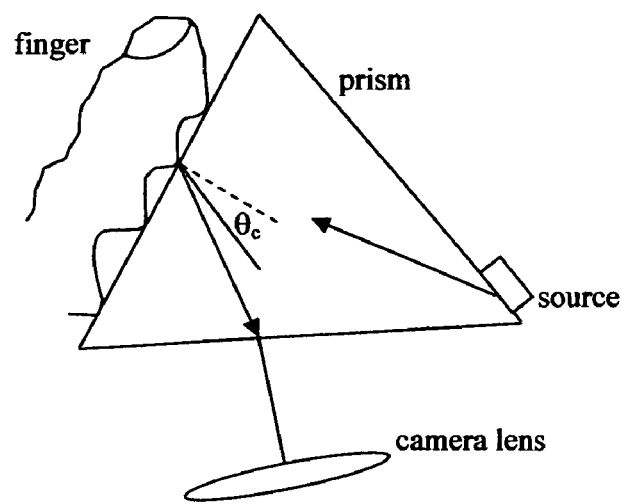
FIG. 2 illustrates the principle of a scattering type of fingerprint sensor.
Figure 3A:
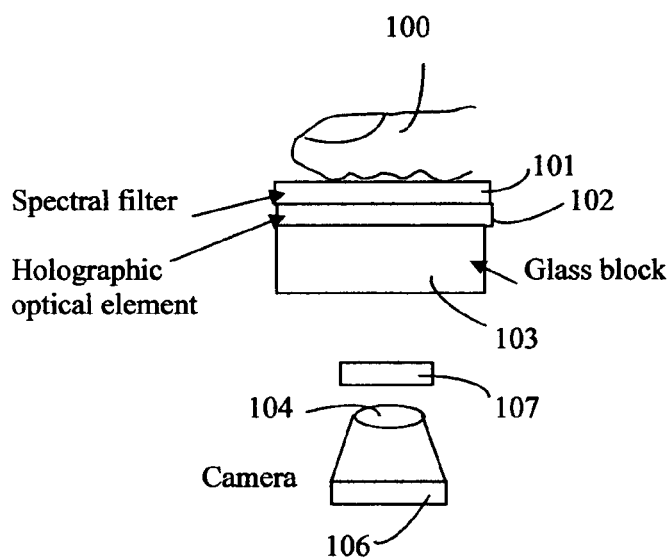
FIG. 3a shows the side view of the device according to the invention.
Figure 3B:
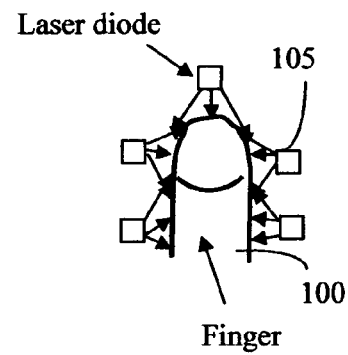
FIG. 3b shows the top view of the sensor including the finger

FIG. 3a shows an example of the optical configuration of the first embodiment of the invention. It includes a sensing surface which is the top surface of the spectral filter 101. The element 102 is a special holographic grating designed to converge oblique incident rays. It is needed to gather information from all the ridges and transmit it to the camera lens. It is basically a transmission hologram of a spherical wavefront and a collimated slanted beam of light. When such a hologram is illuminated by antiparallel collimated beam, the result is a focused spot. The element 103 is a transparent slab of appropriate thickness and serves as a support for the two elements 101 and 102. The thickness is chosen to avoid ghost images due to internal reflections within the element. FIG. 3b shows the top view of the unit. Element 105 is a set of narrow band sources for illumination of the finger 100. Element 104 is the lens system and could comprise of several lenses. Element 106 is an image sensor such as a CCD. The blocking filter 107 is for the purpose of blocking most of the room light while allowing the image signal to get through to the image sensor. In the configuration of FIG. 3a, 107 could be a band pass filter matched to the wavelength of the source 105.

Figure 4:
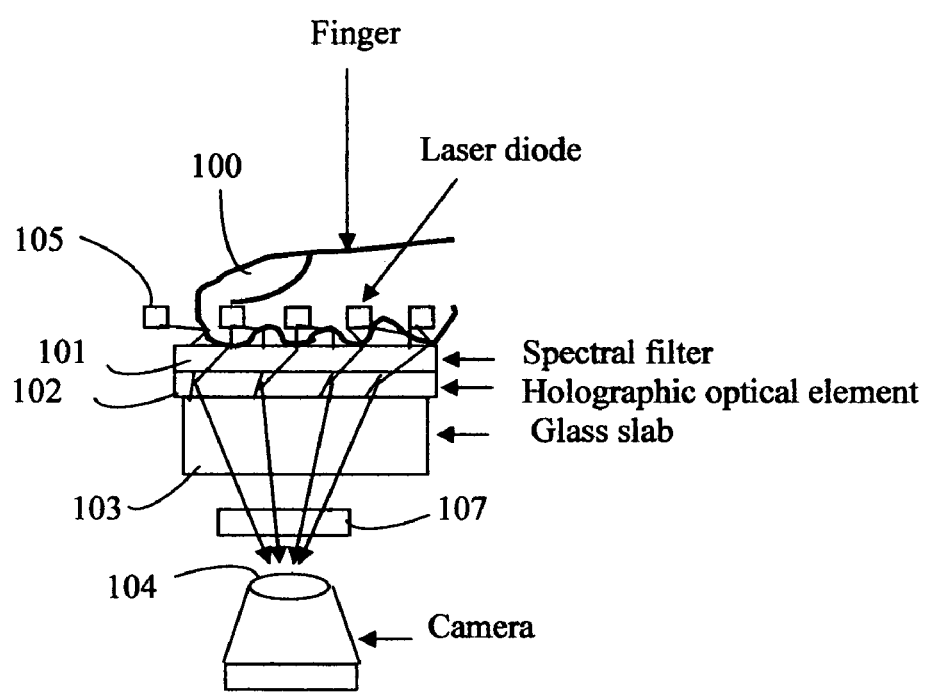
FIG. 4 shows how the rays from the ridges are bent by the holographic optical element.

FIG. 4 shows how the inclined rays from the ridges of the finger are bent by the holographic optical element towards the camera lens 104. The rays (not shown) from the valleys which are confined within the critical angle in the filter medium are blocked by the filter 101.

Figure 5:
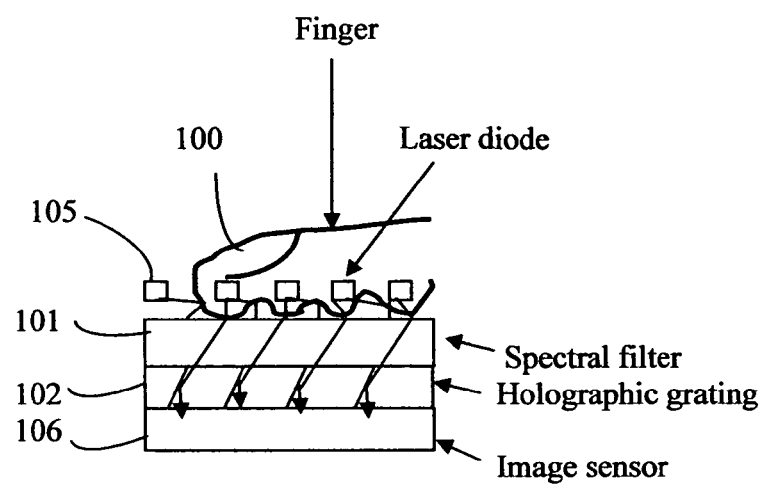
FIG. 5 is a sectional view of a compact fingerprint sensor
Figure 6:
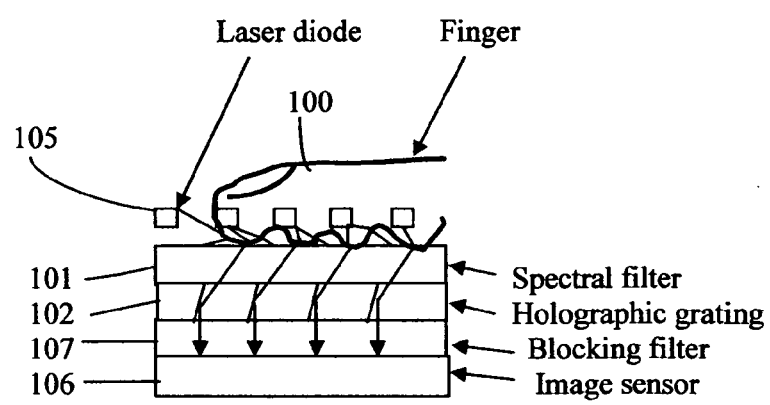
FIG. 6 is like FIG. 5 except for the inclusion of the blocking filter.

FIG. 5 shows the second embodiment of the invention. A thin band pass interference filter 101, a thin holographic optical grating 102 and the image sensor 106 are cemented together to form a compact fingerprint sensor. In case an ideal filter 101 is not available, then a blocking band pass filter matched to the center wavelength of the source 105 is sandwiched between the holographic grating and the image sensor as shown in FIG. 6. Filter 107 would essentially block most of the room light while transmitting the source wavelengths. The elements 101, 102 and 107 must be as thin as possible for sharp imaging.

Figure 7:
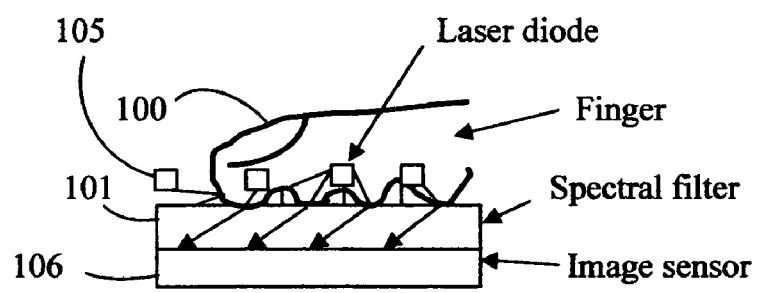
FIG. 7 is a sectional view of the most compact fingerprint sensor of the present invention.
Figure 8:
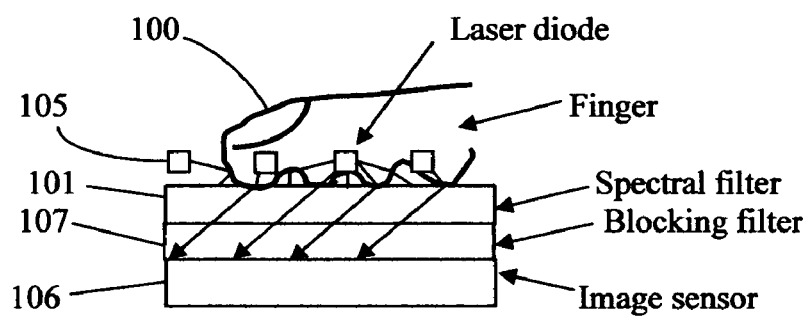
FIG. 8 is like FIG. 7 except for the inclusion of a blocking filter.

FIG. 7 shows the simplest design of a fingerprint device. It consists of a coating of an interference band pass filter over the image sensor. The central wavelength of the narrowband source is shifted with respect to the center of the pass band of the filter. This combination leads to yet another compact fingerprint sensor. A properly designed band pass filter in the form of a thin coating can be sandwiched between the filter 101 and the image sensor 106 to block most of the room light as shown in FIG. 8. Alternately an opaque cover above the finger can be used to block the room light.

What is claimed is:

1. A fingerprint sensing device for acquiring fingerprint, comprising:
   a sandwich of an image sensor and a spectral band pass interference filter for allowing light from finger ridges of a finger to pass through while blocking light from finger valleys of said finger; and
   a set of narrow band sources for illuminating said finger, wherein said image sensor and said spectral band pass interference filter are in optical contact, and
   wherein said spectral band pass interference filter has a first spectral band and said set of sources has a second spectral band, said second spectral band is narrower than said first spectral band.

2. The device of claim 1, wherein said spectral band pass interference filter is coated directly on said image sensor.

3. The device in claim 1 further comprising:
   a holographic optical element sandwiched between said filter and said image sensor,
   wherein said element bends incident oblique rays to rays that are normal to said element.

4. The device of claim 3, wherein said image sensor, said holographic optical element, and said spectral band pass interference filter are cemented together.

5. The device of claim 3 further comprising:
   a blocking band pass filter between said holographic optical element and said image sensor, wherein said blocking filter blocks ambient light while allowing an image of said fingerprint to go through.

6. The device of claim 5, wherein said image sensor, said blocking filter, said holographic optical element, and said spectral band pass interference filter are in optical contacts.

7. A method of providing an image representing surface characteristics of a finger, comprising:
   providing an image sensor in optical contact with a band pass interference filter, said band pass interference filter selectively transmits information from ridges of said finger and blocks information from valleys of said finger;
   placing said finger on a finger-receiving surface;
   illuminating said finger with a narrow band source, said narrow band source has a central wavelength in a band, said central wavelength is lower than a center of a pass band of said interference filter, wherein said band of said narrow band source is narrower than said pass band of said interference filter; and
   receiving said image representing surface characteristics of said finger on said image sensor.

8. The method of claim 7 wherein said interference filter is cemented to or coated on the said image sensor.

9. The method of claim 7 further comprising:
one of providing an opaque cover over said finger and providing a narrow band blocking filter onto said image sensor for blocking ambient light.

10. The method of claim 9, wherein said interference filter, said blocking filter and said image sensor are in optical contact.

11. A method of providing an image representing surface characteristics of a finger, comprising:
providing a stack of elements comprising a band pass interference filter, a holographic optical element for bending rays and an image sensor; wherein said band pass interference filter, said holographic optical element, and said image sensor are in optical contact, and
illuminating said finger with a narrow band source, said narrow band source has a central wavelength in a band, said central wavelength is lower than a center of a pass band of said interference filter, wherein said band of said narrow band source is narrower than said pass band of said interference filter; and
receiving said image representing surface characteristics of said finger on said image sensor.

12. The method of claim 11 further comprising:
providing an opaque cover over said finger to block ambient light.

13. The method of claim 11 further comprising:
providing a narrow band blocking filter sandwiched between said holographic element and said image sensor to block ambient light while transmitting said image representing surface characteristics of said finger to said image sensor.

* * * * *